(12) United States Patent
Debon

(10) Patent No.: US 8,578,848 B2
(45) Date of Patent: Nov. 12, 2013

(54) FOOD PROCESSING APPARATUS

(75) Inventor: Mari Debon, Wyomissing, PA (US)

(73) Assignee: Jerome R. Smith, Jr., Overland Park, KS (US), part interest ( * ) Notice: Subject to any disclaimer, the term of this patent is extended or adjusted under 35 U.S.C. 154(b) by 782 days.

(21) Appl. No.: 12/033,696

(22) Filed: Feb. 19, 2008

(65) Prior Publication Data

US 2008/0206421 A1 Aug. 28, 2008

Related U.S. Application Data

(60) Provisional application No. 60/890,655, filed on Feb. 20, 2007, provisional application No. 61/020,312, filed on Jan. 10, 2008.

(51) Int. Cl.
*B30B 9/26* (2006.01)
*A23L 3/365* (2006.01)

(52) U.S. Cl.
USPC ............. 100/126; 100/127; 100/130; 99/508; 426/524

(58) Field of Classification Search
USPC ............ 100/110, 126, 127, 130, 132; 99/495, 99/502, 504, 505, 508; 426/524
See application file for complete search history.

(56) References Cited

U.S. PATENT DOCUMENTS

| | | | | |
|---|---|---|---|---|
| 564,595 A * | 7/1896 | Cunningham | .................. | 241/95 |
| 731,557 A * | 6/1903 | Fanners | ........................ | 241/168 |
| 1,034,207 A * | 7/1912 | Corbett | ......................... | 100/125 |
| 1,098,446 A * | 6/1914 | Johnson | ...................... | 100/98 R |
| 1,146,656 A * | 7/1915 | Rogers | ............................. | 100/97 |
| 1,432,754 A | 10/1922 | Hollowell et al. | | |
| 1,939,556 A * | 12/1933 | Kammer | ....................... | 100/127 |
| 2,955,530 A | 10/1960 | Nilo | | |
| 3,698,460 A * | 10/1972 | Ashton et al. | .............. | 241/273.1 |
| 3,995,544 A | 12/1976 | Farley | | |
| 4,958,557 A * | 9/1990 | Fiala | ............................... | 99/495 |
| 4,972,059 A | 11/1990 | Wendt et al. | | |
| 5,312,054 A * | 5/1994 | Feer et al. | ....................... | 241/95 |
| 5,320,031 A * | 6/1994 | Whitney | ......................... | 99/495 |
| 5,419,250 A | 5/1995 | Ferguson | | |
| 5,590,590 A * | 1/1997 | Zammit | .......................... | 99/495 |
| 5,711,491 A * | 1/1998 | Molo | ............................... | 241/95 |
| 6,097,017 A * | 8/2000 | Pickford | ...................... | 219/725 |
| 6,196,122 B1 | 3/2001 | Lai | | |
| 6,486,455 B1 | 11/2002 | Merabet | | |
| 6,672,204 B2 | 1/2004 | Fiorello | | |
| 2002/0020702 A1 | 2/2002 | Matsuno et al. | | |

OTHER PUBLICATIONS

International Search Report and Written Opinion issued in related PCT Patent Application Serial No. PCT/US2008/054300, 6 pages, Jun. 20, 2008.

* cited by examiner

*Primary Examiner* — Jimmy T Nguyen
(74) *Attorney, Agent, or Firm* — Jerome R. Smith, Jr.; Gerry J. Elman; Elman Technology Law, P.C.

(57) ABSTRACT

An apparatus with a box-like container includes apertures, and a block member for moving within a cavity in the box-like container. The apparatus is a single unit, from which frozen food, typically in blocks, or out of bags, containers, and the like, may be defrosted and/or, cooked, and then strained, drained or dried, with minimal, if any, spillage or mess.

26 Claims, 4 Drawing Sheets

FOOD PROCESSING APPARATUS

RELATED APPLICATIONS

This application is related to and claims priority from commonly owned U.S. Provisional Patent Applications: Ser. No. 60/890,655, entitled: Food Processing Apparatus, filed on Feb. 20, 2007, and Ser. No. 61/020,312, entitled: Food Processing Apparatus, filed on Jan. 10, 2008, the entire disclosures of which are incorporated by reference herein.

TECHNICAL FIELD

The present disclosed subject matter is directed to apparatus and methods for defrosting and draining food products, specifically frozen foods, such as vegetables, that are packaged and stored in frozen blocks or bagged.

BACKGROUND

Vegetables, such as spinach, beans, peas, broccoli, corn, and the like, are typically frozen in blocks in correspondingly shaped packages, or in frozen pieces in bags. For example, vegetables in frozen blocks are typically in rectangular box-like packages, typically of paper, or lightweight cardboard or plastic. For example, a rectangular package of frozen vegetables encloses an approximately ten ounce net weight frozen block of vegetables, and measures approximately 5.5 inches by 4 inches by 1.5 inches. Bags are typically of plastic or paper, and are sized to accommodate multiple net weights of frozen vegetables, an example being bags to accommodate net weights of frozen vegetables of 16 ounces and upward. The vegetables are typically removed from the package as a frozen block, or as frozen pieces from bags. The vegetables are then defrosted and/or cooked.

Defrosting may occur in the package (frozen block or portions thereof) or bag (frozen pieces) in the ambient environment, with the package or bag typically on a plate or the like, or in a container or the like, to hold and confine the water resulting from defrosting. Ambient defrosting may also involve the contents of the package or bag being emptied onto a plate or into a container, pot or the like. The plate or container with the vegetables may be further defrosted and/or cooked in a microwave oven, or other heat providing or cooking device. The frozen block or frozen pieces may also be defrosted and/or cooked by being placed directly into a pot of boiling water.

Once the defrosting or cooking is complete, the vegetables must be drained or strained. This involves using one or more pieces of additional equipment, including a straining or draining device, such as a colander, strainer or the like. Transfer of the now defrosted or cooked food, from the plate or container where the defrosting and/or cooking occurred, to the straining or draining device, may involve yet an additional service item, such as a cup, bowl or the like.

Transferring the vegetables between the aforementioned pieces of equipment, service items and the like, is time consuming and inefficient. It also wastes resources, as each piece of equipment or service item must be cleaned after use. In many cases, the vegetables emit colors, whereby the equipment or service items must be cleaned shortly after use, such that they are not stained or damaged. Additionally, the user must possess all of the pieces of equipment or service items to properly process the vegetables or food in the aforementioned manner.

Moreover, since food must be transferred between different pieces of equipment or service items for each portion of the aforementioned processing, there is a chance of spillage of both liquid and food. Additional time and labor is necessary to clean up these spills. Furthermore, if the spills are of colored liquid or food, they must be attended to immediately, and may require additional soaps, cleaners or the like, to properly clean the spills and avoid staining or other damage.

SUMMARY

The present disclosed subject matter overcomes the drawbacks associated with conventional cookware, by providing a single apparatus or single unit, from which frozen food, typically in blocks (from boxes or other similar containers), or in pieces (loose) out of bags, containers, and the like, may be defrosted and/or, coked, and then strained, drained or dried, with minimal, if any, spillage or mess. The frozen food is, for example, packaged vegetables, such as spinach, beans, peas, broccoli, corn, and the like.

The disclosed subject matter is directed to an apparatus that is usable for the processes of defrosting and/or cooking and draining or staining food, typically vegetables, initially in a frozen condition, such as in a block or in pieces (loose). The apparatus includes a container with a block member for moving within the container, for forcing liquid from food or the like, out of the container. The container includes an open end and a closed end and a first side and a second side, and an internal to interior cavity between the first side, the second side and the closed end, for receiving and holding food. There are also a plurality of apertures at the closed end, through which liquid from the food leaves the internal cavity of the container. The block member is correspondingly configured with respect to the shape of the internal cavity for moving within the internal cavity of the container. The container is such that when it rests on a surface, its internal cavity is angled (tilted) with respect to the surface. The angling or tilting is upward, from the closed end, that contacts the surface, to the open end, that is raised above the surface, the open end being at an elevation above the closed end.

Another embodiment is directed to an apparatus for processing food, that is formed of a container. The container includes a container body with a closed end and an open end, and at least one member, for example, one or more feet extending from the container body, and coupled with the container body, for maintaining the container body at an angle with respect to a surface, such that the open end is at an elevation greater than elevation of the closed end. The container body also includes a first wall and a second wall oppositely disposed with respect to each other and extending between the open end and the closed end; and, lateral walls, oppositely disposed from each other, intermediate the first wall and the second wall, the lateral walls extending between the open end and the closed end. There is an interior cavity defined by the space between the first and second walls and the lateral walls; and, there is at least one aperture at least at the closed end of the container body. The at least one aperture generally includes plural apertures in the first wall and the lateral walls, proximate to the first wall. The apparatus also includes a block member for fitting inside of the interior cavity and being movable therein.

Also disclosed is a method for removing moisture from food, for example, frozen or defrosted food with water or moisture still remaining on the food. The method includes, providing a container including an open end and a closed end and a first side and a second side, an internal cavity between the first side, the second side and the closed end configured for receiving food, and a plurality of apertures at the closed end. Frozen food or otherwise defrosting food is placed into the internal cavity of the container. The container is placed on a surface, such that the container is oriented on an angle and the open end is above the closed end. This tilted orientation also a allows liquid to collect or pool in the internal cavity at the closed end of the container, such that the liquid remains in the container until it is reoriented. The frozen or defrosting food defrosts, such that liquid collects in the internal cavity at the closed end of the container. A block member, correspondingly configured with respect to the shape of the internal cavity for moving within the cavity is provided, and the block member is brought into the internal cavity and pushed toward the closed end of the container to contact the food and force liquid out through apertures of the plurality of apertures. With the liquid forced out, the block member is removed from the internal cavity, and the food is removed from the container through the open end.

BRIEF DESCRIPTION OF THE DRAWINGS

Attention is now directed to the drawing figures, where like numerals or characters indicate corresponding or like components. In the drawings.

DETAILED DESCRIPTION

In this document, references are made to directions, such as upper, lower, top, bottom, up, down, upward, downward, front, rear, above, below, lateral and variations thereof. These directional references are exemplary, to show the disclosed subject matter in a typical orientation, and are in no way limiting.

Figure 1:
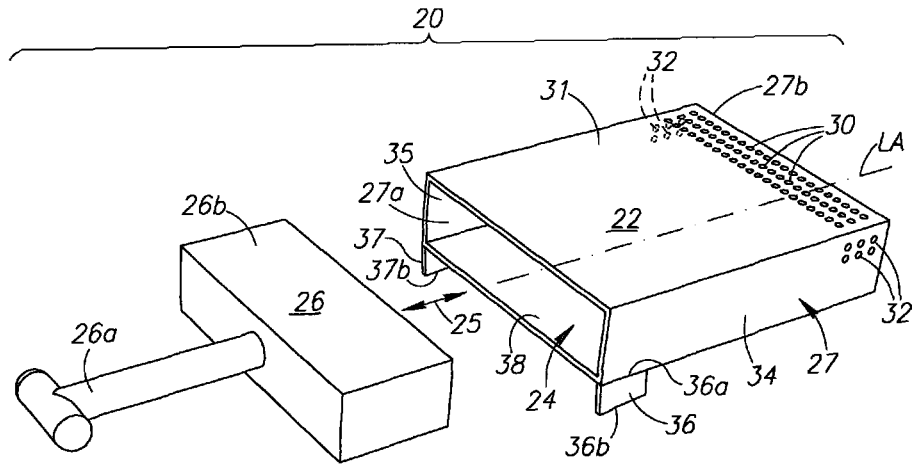
FIG. 1 is an exploded perspective view of the apparatus.
Figure 2:
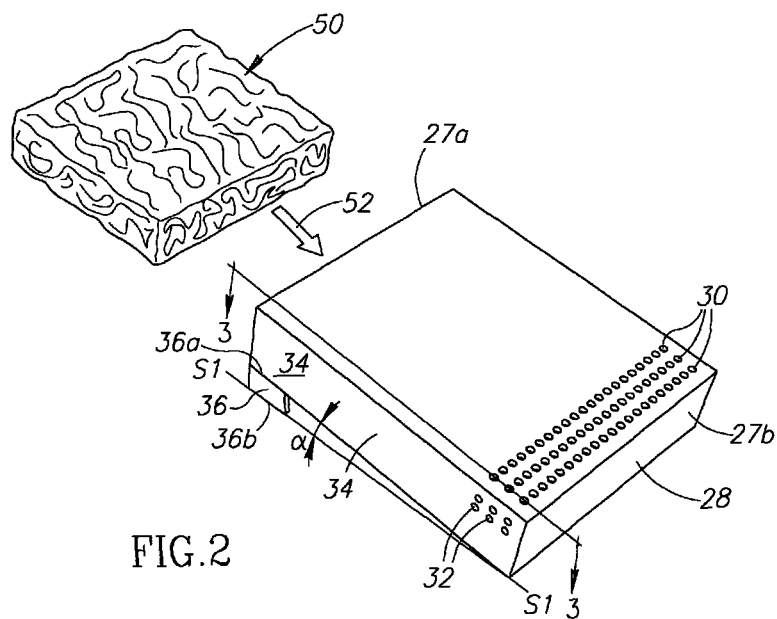
FIG. 2 is a perspective view of the apparatus of FIG. 1, with a block of frozen food being inserted into the container of apparatus.

FIGS. 1 and 2, show the apparatus 20 including a container 22, having an interior cavity 24 and a block member (or pusher) 26, with a handle 26a or gripping member, and a contact portion 26b. The block member 26 fits into the container 22 so as to be movable within the interior cavity 24 (or cavity), for example, upward and downward, in the directions as indicated by the double headed arrow 25. The block member 26 is correspondingly configured with respect to the shape of the interior cavity 24, so as to occupy a substantial portion of the cross-sectional area of the container 22.

The container 22 includes a body 27 (also referred to as the container body), that is, for example, rectangular-shaped, with an interior cavity 24 of uniform or generally uniform cross section. The body 27 of the container includes an open, upper or top, end 27a, and a closed, lower or bottom end 27b. The open, upper or top end 27a, and closed, lower, or bottom end 27b also define the corresponding ends of the container 22, and are used interchangeably herein. The open, upper or top end 27a, while shown as open, may also include an opening (or open side), and the closed, lower or bottom end 27b is defined by a closed, lower or bottom side 28. A longitudinal axis LA extends through the container body 27, between the open 27a and closed 27b ends, and serves as an axis of symmetry for the container body 27. While a box-like rectangular shape for the body 27 of the container 22 is shown, other cubic or cube-like shapes for the container 22 (container body 27) are also permissible, with the block member 26 being correspondingly shaped to be movable within the interior cavity 24.

There are apertures 30 along a first or front side 31 proximate to the closed end 27b. There are also apertures 32 along the lateral sides 34, 35, that are proximate to the front side 31. The apertures 30, 32 are typically rounded holes, for example, circular in cross-sectional shape, so as to define cylindrical (or disk) shaped bores extending through the front 31 and lateral 34, 35 sides of the container 22, from the cavity 24 to the ambient environment. The apertures 30, 32 may also be slots, slits, gratings and the like in various other shapes, for example, squares, rectangles, ovals, and the like.

Feet (also known as supports or support members) 36, 37, protrude (extend) from a second or rear side 38 of the body 27 of the container 22, proximate to the open end 27a, and are flush with or proximate to the lateral sides 34, 35 of the body 27. The feet 36, 37 are oriented so as to be parallel or substantially parallel with the longitudinal axis LA.

The feet (supports or support members) 36, 37 are shaped to allow the container 22 to be positioned, for example, on a flat surface (S1 of FIG. 2, 54 of FIGS. 3A and 3B), such that the container 22 can rest in a tilted position (orientation), as it is angled (inclined) upward, from the closed end 27b to the open end 27a, along the rear side 38. In this titled position, the open end 27a is above the closed end 27b of the container 22 (and the open end 27a is at a higher elevation than the closed end 27b, with respect to the surface). The angling may be, for example, at an angle α (FIGS. 2 and 3A), that may be approximately 2 degrees or greater, with respect to the horizontal (for example, a surface), and, as another example, may be approximately four degrees with respect to the horizontal. This angling (represented, for example, by the angle α) is such that any liquid in the container 22 will remain below the apertures 30, 32, confined in the container 22 while the container 22 rests (sits) in the position shown in FIGS. 2, 3A and 3B.

Figure 3A:
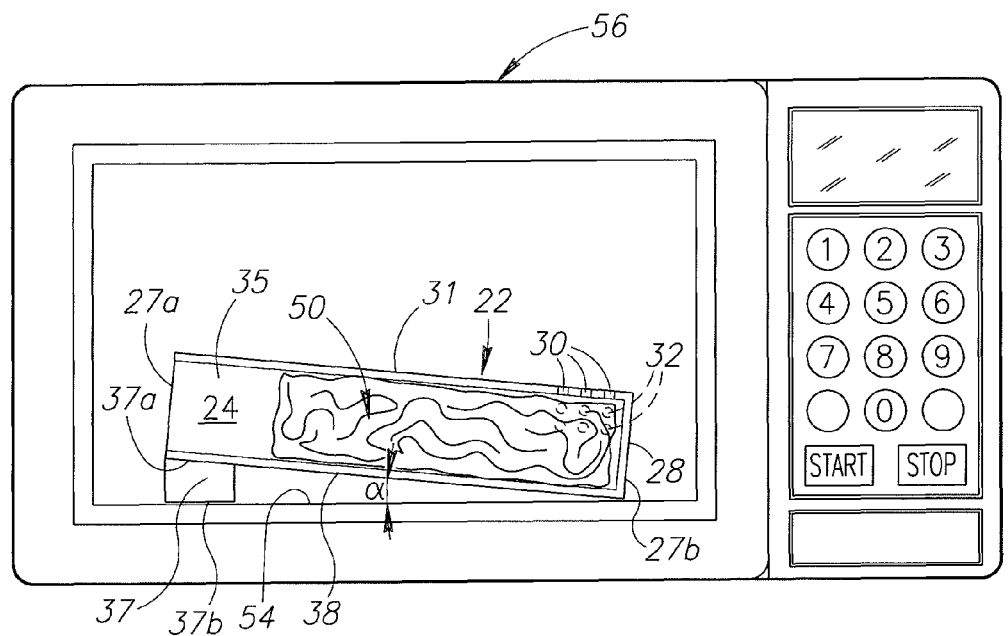
FIG. 3A is a cross-sectional view of the apparatus of FIG. 2, taken along line 3-3, with a block of frozen food therein, upon being placed into a defrosting mechanism.

The feet 36, 37 attach to the body 27 along upper edges 36a, 37a (FIG. 3A). These upper edges 36a, 37a are angled (for example, at the angle α), with corresponding lower edges 36b, 37b, that are straight (right angles with respect to the side edges of the feet 36, 37), for maximum contact with the surface (for example, the surface S1 as shown in FIG. 2 and the surface 54 in FIGS. 3A and 3B) on which the container 22 rests. Alternately, the feet 36, 37 may be straight along their upper edges 36a, 36b, that contact the body 27 at the second or rear side 38, with angled (for example, at the angle α) lower edges 36b, 37b. In another alternate, one or more square or rectangular feet may attach to the rear side 38 at the open end 27a, proximate to the opening of the container body 27, in an orientation perpendicular or substantially perpendicular to the longitudinal axis LA. These square or rectangular feet would elevate the open end 27a to allow the container 22 to rest (sit) on a surface in the aforementioned tilted position (orientation), with the open end 27a being above the closed end 27b, as detailed above.

While two feet 36, 37 are shown, positioned at the open end 27a of the container 22, and spaced apart from each other so as to be proximate to or flush with the respective lateral sides 34, 35 of the body 27, other alternate configurations (shapes) of the feet 36, 37, spacings of and positions of the feet 36, 37, arrangements of the feet 36, 37 with respect to the container body 27, and amounts of the feet 36, 37 (single or multiple), are also permissible. These alternates are permissible, provided that they allow the container 22 to rest (sit) on a surface in the aforementioned tilted position (orientation) (with the open end 27a being above the closed end 27b), as detailed above.

The apertures 30, 32, are positioned, such that when the container 22 rests on a surface in a tilted position, in accordance with any of the configurations detailed above, the feet 36, 37 and the closed end 27b, are in contact with the surface (as detailed above and as shown, for example, in FIGS. 3A and 3B, discussed below), and there is space for liquid to collect and remain confined in the container 22, below the apertures 30, 32. The liquid 58 results from defrosting or cooking, and remains in the container 22 (the level 60 of the liquid 58 remains below the apertures 30, 32), until the container 22 is repositioned or reoriented, for example, when the food 50 is drained, or strained by the user, as detailed below.

Figure 3B:
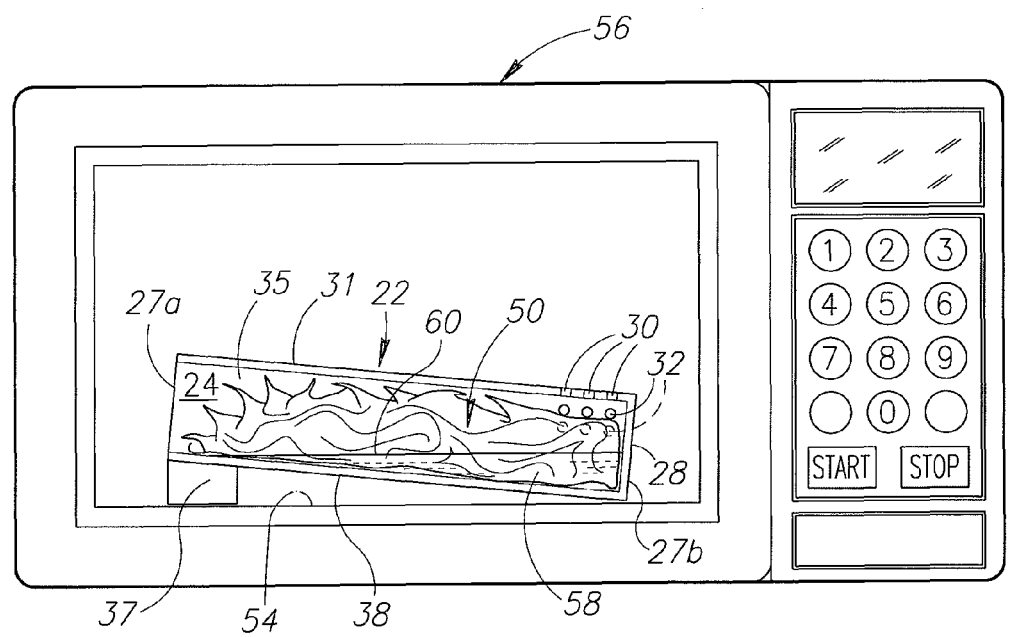
FIG. 3B is a cross-sectional view of the apparatus of FIG. 2, taken along line 3-3, with a block of frozen food therein, upon being defrosted in a defrosting mechanism.

Also, any size apertures 30, 32, and arrangement thereof, on either the front side 31 alone, one or two lateral sides 34, 35 only, or any combination of front 31 and lateral 34, 35 sides, is permissible, provided the apertures 30, 32 are arranged to be above liquid (water) levels from the defrosted (or cooked) frozen food in the container 22, when the feet 36, 37 and the closed end 27b of the container 22 rest on a surface (and the liquid 58, e.g., water, remains confined in the container 22, as shown in FIG. 3B).

The container 22 is typically a unitary member, formed of a microwave-safe, food grade material, such as a microwave safe food grade plastic. This material may be, for example, Lexan®, from GE Plastics of the General Electric Company. The container 22 may, for example, be formed by conventional manufacturing techniques, including injection and rotational molding, or the like. Similarly, the block member 26, with its handle 26a and contact portion 26b, may be a unitary member of the same material as the container 22 formed by the same techniques. Alternately, the container 22 and the block member 26 may be formed of multiple pieces, fastened together with conventional microwave safe food grade adhesives and the like.

The container 22, may be, for example, of dimensions, of approximately six inches by approximately four and one-half inches by approximately two inches, to accommodate a frozen block of vegetables, such as a conventional ten ounce package of frozen vegetables, such as frozen spinach, beans, peas, broccoli, corn, and the like. The block member 26 may be, for example, of a cross sectional area of approximately 3.75 inches by 1.75 inches (with a thickness if approximately half and inch), so as to move freely up and down within the cavity 24 of the container 22. There is a small amount of room between the block member 26 and the body 27 of the container 22, to accommodate vegetables or food that may become lodged between the block member 26 and the body 27, allowing the block member 26 to keep moving without substantial extra force being applied. However, tighter or looser tolerances are also permissible. The handle 26a is typically long enough to be easily gripped when the contact portion 26b is well within the cavity 24 of the container 22. Moreover, the apparatus 20 is easily scalable, and may be easily configured to be of larger or smaller dimensions.

Attention is now directed to FIGS. 3A-5. These drawing figures show an exemplary operation of the apparatus 20.

Turning back to FIG. 2, there is shown the container 22 receiving a block of frozen vegetables or food 50, into the cavity 24. The frozen food, may be, for example, frozen vegetables, as conventionally packaged, in rectangular or square blocks, with the packaging removed. Throughout this document, food and vegetables are used interchangeably.

The frozen food in the block 50, is placed into the cavity 24 of the container 22 in the direction of the arrow 52, and travels to the closed (lower) end 27b of the container 22, typically resting against the lower side 28 along the rear side 38. The container 22 is then placed on a surface 54, such as the flat surface of a microwave oven 56, or other defrosting device or defrosting and cooking device. The microwave oven 56 can be adjusted and activated to defrost or defrost and cook the vegetables (food) of the block 50.

The container 22 can also be placed onto a flat surface and allowed to defrost in the ambient environment. The container 22, with the block of frozen vegetables 50 therein, rests in a tilted position or orientation, with the open end 27a above the closed end 27b of the container, such that the feet 36, 37 and closed end 27b of the container 22 are in contact with the flat surface 54, as shown in FIG. 3A.

FIG. 3B shows the vegetables 50 (no longer as a frozen block) in the microwave oven 56 with defrosting and/or cooking, now complete. Ambient defrosting would produce a similar result. The vegetables 50 have settled, as the liquid 58 from defrosting/and or cooking pools or collects in the interior cavity 24 at the closed end 27b of the container 22. The liquid 58 remains in the container 22, as the level 60 of liquid 58 is below the lowermost apertures 30, 32.

Figure 4:
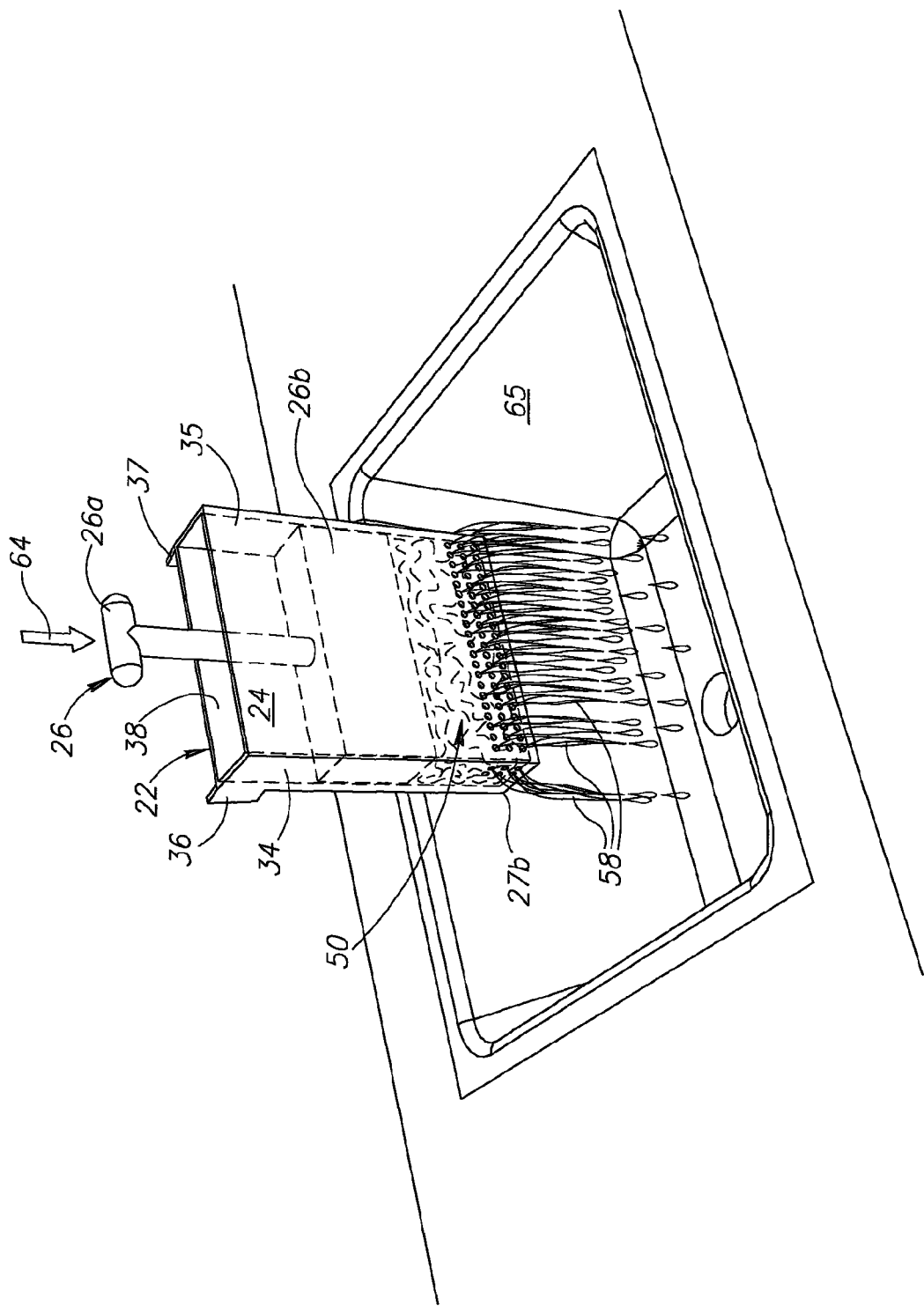
FIG. 4 is a perspective view showing the apparatus with the defrosted food therein being drained; and, FIG. 5 is a perspective view of the apparatus with the drained food being deposited into a container for use.

As shown in FIG. 4, the container 22 with the defrosted and/or cooked food 50 is now removed from the microwave oven 56, and the block member 26 is reinserted into the cavity 24 (shown in broken lines) of the container 22, above the food 50. The block member 26 is pushed downward at the handle 26a, in the direction of the arrow 64, with the contact portion 26b pushing against the food 50. The pushing is such that the food 50 is compressed or squeezed between the contact portion 26b of the block member 26 and the lower side 28 of the container body 27, coupled with the confinement by the front 31, rear 38 and lateral 34, 35 sides, such that liquid 58 exits the apertures 30, 32.

Continued pressure downward (downward pushing) on the food 50 by the block member 26, may continue until as much liquid 58 as desired, or as possible, can be removed from the food 50, such that it is drained or strained. Moreover, the food 50 may be drained or strained, by applying strong manual forces downward on the block member 26 in the container 22, such that, for example, with spinach and the like, the leaves are dry or will dry quickly. The exiting liquid 58 is typically directed to a sink 65, basin, or the like, eliminating any mess associated with the drainage or straining process.

Figure 5:
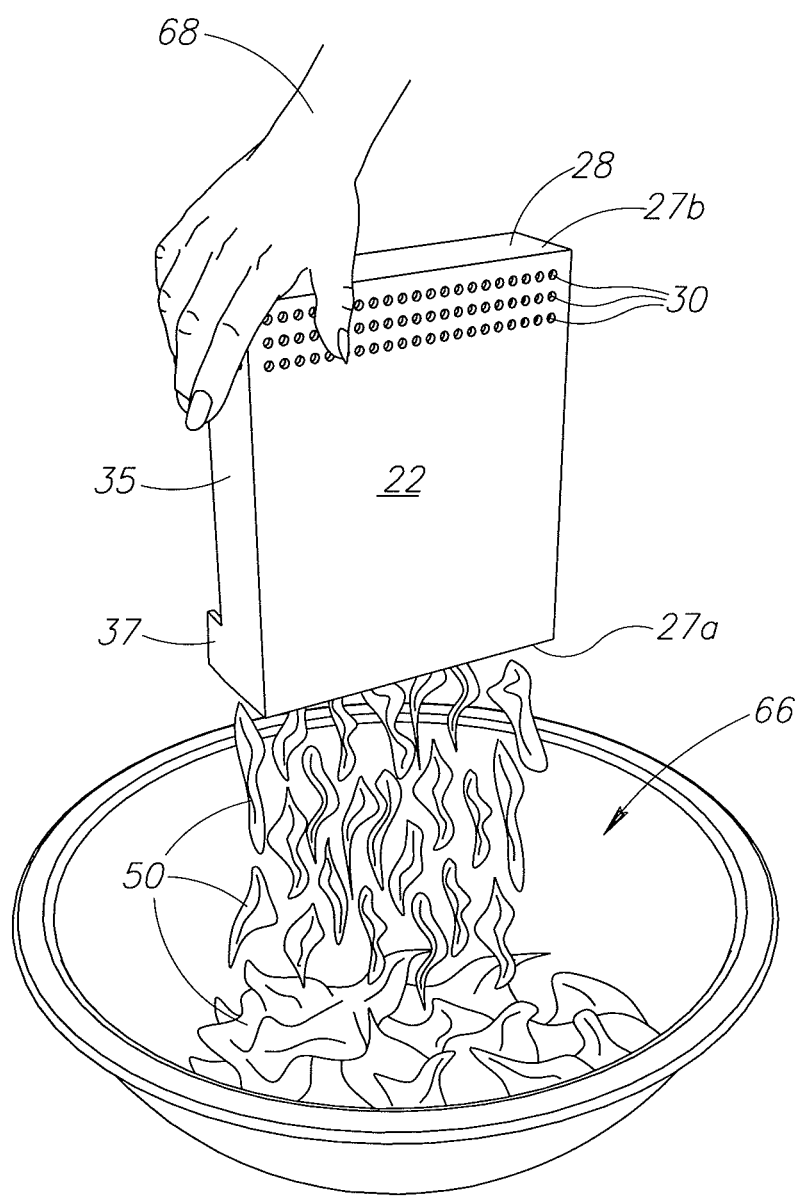

The now-drained and/or, strained and potentially dried, depending on the sitting time post drainage, and in some cases cooked, food 50 may now be removed from the container 22. As shown in FIG. 5, the container 22 may now be inverted, over a bowl 66, pot, or the like, by a user 68, and tapped, or an instrument inserted into the cavity 24, to free the food 50, such that it falls into the bowl 66.

While preferred embodiments of the disclosed subject matter have been described, so as to enable one of skill in the art to practice the disclosed subject matter, the preceding description is intended to be exemplary only. It should not be used to limit the scope of the disclosed subject matter, which should be determined by reference to the following claims.

What is claimed is:

1. An apparatus for defrosting and draining food comprising:
   a container configured for resting unsupported on a surface, the container including an open end and a closed end, and,
   a first side, a second side, a first lateral side, and a second lateral side extending between the closed end and the open end, and a cross side between the first side, the second side, the first lateral side, and the second lateral side at the closed end, thereby defining an internal cavity between the first side, the second side, the first lateral side, the second lateral side, and the cross side, and extending between the open end and the closed end, and, the internal cavity being inclined upward from the closed end, and, there being a plurality of apertures at the closed end positioned at least proximate to the cross side, and, the container being constructed to allow liquid to collect in the internal cavity when the container rests unsupported on a surface, and to remain in the internal cavity without leakage through an aperture of the container for a period of time until the container is repositioned upwards; and, a block member correspondingly configured with respect to the shape of the internal cavity for moving within the internal cavity.

2. The apparatus of claim 1, additionally comprising:

at least one foot protruding from the second side proximate to the open end to define the internal cavity being inclined upward from the closed end.

3. The apparatus of claim 2, wherein the at least one foot includes two oppositely disposed feet.

4. The apparatus of claim 3, wherein the two oppositely disposed feet attach at the second side.

5. The apparatus of claim 3, wherein a plurality of apertures are formed in at least the first side proximate to the cross side.

6. The apparatus of claim 5, wherein the container is of a microwave safe plastic material.

7. The apparatus of claim 5, wherein a plurality of apertures are formed in at least one of the lateral sides proximate to the cross side.

8. An apparatus for processing food comprising:

a container comprising:

a container body including:

a first open end and an oppositely disposed second closed end;

a first wall and a second wall oppositely disposed with respect to each other and extending between the first open end and the second end;

lateral walls, oppositely disposed from each other, intermediate the first wall and the second wall, the lateral walls extending between the first open end and the second closed end;

a cross wall at the second closed end in communication with the first wall, the second wall, and the lateral walls;

an interior cavity defined by the space between the first and second walls, the lateral walls, and the cross wall; and there being at least one aperture positioned proximate to the second closed end of the container body in at least one wall selected from the group consisting of the first wall and each of the lateral walls; and there being no aperture in the second wall, and there being no aperture positioned proximate to the first open end;

at least one member in communication with the container body for inclining the container body upward from the second closed end, such that the container is configured for resting unsupported on a surface, and the at least one aperture being positioned on the container body to allow liquid to collect in the interior cavity when the container rests unsupported on a surface, and the container body is constructed to allow liquid to collect in the interior cavity, and remain in the interior cavity without leakage through an aperture of the container for a period of time until the container is repositioned upwards.

9. The apparatus of claim 8, wherein the at least one member is at least proximate to the first open end of the container body.

10. The apparatus of claim 9, wherein the at least one member includes two feet oppositely disposed from each other at least proximate to each of the lateral walls.

11. The apparatus of claim 10, wherein the feet are attached to the container body at the second wall.

12. The apparatus of claim 9, wherein the interior cavity includes a longitudinal axis extending between the second end and the open end and the at least one member is oriented at least substantially perpendicular to the longitudinal axis.

13. The apparatus of claim 12, wherein the at least one member is attached to the container body at the second wall.

14. The apparatus of claim 8, wherein the at least one aperture includes a plurality of apertures.

15. The apparatus of claim 14, wherein the plurality of apertures are additionally formed in at least one of the lateral walls, proximate to the cross wall.

16. The apparatus of claim 14, wherein the apertures of the plurality of apertures are positioned in the first wall and the lateral walls, the apertures proximate to the cross wall.

17. The apparatus of claim 12, additionally comprising:

a block member for fitting inside of the interior cavity and being axially movable therein.

18. The apparatus of claim 17, wherein the block member includes a block with a shape corresponding to the cross-sectional shape of the interior cavity and a handle attached to the block.

19. The apparatus of claim 8, wherein the container is of a microwave safe plastic material.

20. The apparatus of claim 1, wherein the first side defines an upper side and the second side defines a lower side.

21. An apparatus for defrosting and draining food comprising:

a container comprising:

a body including a first end and a second end, the first end including an open portion and the second end including a closed portion, and, a first side, a second side, a first lateral side, and a second lateral side extending between the first end and the second end, thereby defining an internal cavity between the first side, the second side, the first lateral side, and the second lateral side, and extending between the first end and the second end, the internal cavity configured in the body to be inclined upward from the second end to the first end when the container is resting on a surface, and, the second end including a plurality of apertures, the plurality of apertures being arranged on the body in at least one side selected from the group consisting of the first side, the first lateral side, and the second lateral side to allow liquid to collect in the internal cavity when the container rests on a surface, and, there being no apertures arranged on the body in the second side and no apertures positioned proximate to the open portion, and, the container being constructed to allow liquid to collect in the internal cavity when the container rests on the surface, and to remain in the internal cavity without leakage through an aperture of the container for a period of time until the container is repositioned upwards.

22. The apparatus of claim 21, wherein the container additionally comprises:

at least one support in communication with the body at a location of the body for inclining the internal cavity upward from the second end to the first end when the container is resting on a surface.

23. The apparatus of claim 22, wherein the location of the body includes the second side.

24. The apparatus of claim 21, wherein the closed portion includes a cross member extending between the first side, the second side, the first lateral side, and the second lateral side at the edge of the second end.

25. The apparatus of claim 24, wherein the each aperture of the plurality of apertures is positioned proximate to the edge of the second end.

26. The apparatus of claim 21, additionally comprising: a block member correspondingly configured with respect to the shape of the internal cavity for moving within the internal cavity between the first end and the second end of the body.

\* \* \* \* \*